(12) United States Patent
Stetson et al.

(10) Patent No.: US 7,457,258 B2
(45) Date of Patent: Nov. 25, 2008

(54) TUNABLE FILTER TO FACILITATE COMMUNICATIONS

(75) Inventors: Philip Sean Stetson, Garland, TX (US); Richard Knight Hester, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 793 days.

(21) Appl. No.: 10/749,201

(22) Filed: Dec. 31, 2003

(65) Prior Publication Data

US 2005/0141440 A1 Jun. 30, 2005

(51) Int. Cl.
*H04B 3/20* (2006.01)
(52) U.S. Cl. ...................................... 370/286
(58) Field of Classification Search .................. 370/286
See application file for complete search history.

(56) References Cited

U.S. PATENT DOCUMENTS 5,559,470 A * 9/1996 Laber et al. ................. 330/252
6,343,024 B1   1/2002 Zabroda
6,445,791 B1 * 9/2002 Grisamore et al. .......... 379/402
6,751,202 B1 * 6/2004 Henrie ....................... 370/286
6,944,213 B2 * 9/2005 Lee ............................ 375/220
2001/0021250 A1 * 9/2001 Vanderbauwhede et al. ................... 379/406.06
2001/0033650 A1 * 10/2001 Wilson et al. ............... 379/398
2003/0012364 A1 * 1/2003 Lee ............................ 379/402

OTHER PUBLICATIONS

Bob Day, Scott Wurcer and Tom Hoffman; "'Bridging' ADSL line driver challenges"; Electronics Engineer, Feb. 2000, 5 pages.

* cited by examiner

*Primary Examiner*—Ramnandan Singh
(74) *Attorney, Agent, or Firm*—Steven A. Shaw; W. James Brady; Frederick J. Telecky, Jr.

(57) ABSTRACT

Systems and methods are described herein for changing the frequency response of a filter, such as a hybrid circuit. One or more tunable components are adjustable to provide the hybrid circuit with a frequency response corresponding to the characteristics of an associated communications network, such as a digital subscriber link.

27 Claims, 5 Drawing Sheets

TUNABLE FILTER TO FACILITATE COMMUNICATIONS

TECHNICAL FIELD

The present invention is directed to communications, and more specifically to a tunable system and method for tuning a system to facilitate communications.

BACKGROUND OF THE INVENTION

In a full-duplexed communication system, both the transmitted and received signals are superposed at nearly all circuit nodes. Circuit techniques are employed to eliminate the transmitted signal from the receiver signal path to avoid corrupting the signal-to-noise ratio associated with the received signal. When the signals occupy different portions of the frequency spectrum, this can be achieved by using filters. If, however, their spectra overlap, a circuit commonly referred to as a hybrid must be employed.

Hybrids can be comprised of passive circuits. Typical coupling between the subscriber loop (transmission line) and the modem uses transformers. Transformers provide several advantages including signal gain and isolation, but require the use of inductors in a passive hybrid circuit. This may be problematic since the required inductors undesirably increase the hybrid parts count as well as the area of the modem printed circuit board that employs the hybrid.

In a typical Asymmetric Digital Subscriber Line (ADSL) system, a hybrid circuit is used within the central office modem (in parallel with the subscriber loop interface circuit) to separate transmit signal from the receive signal path. The hybrid circuit characteristics are typically designed to match the transfer function from the transmitter output to the receiver input. The degree to which it achieves this matching dictates the efficacy of the hybrid circuit. A well-matched hybrid significantly attenuates the amount of transmit signal that exists in the receive signal path. This transmit signal, if not sufficiently attenuated, reduces the dynamic range of the receive channel and degrades modem performance.

Central office ADSL modem performance (most specifically upstream data rate) is a strong function of hybrid performance. At the central office, usually the transmit signal is strong and the receive signal is weak. Loop characteristics can vary and hybrid performance typically degrades with varying loop characteristics, such as the loop impedance. The transfer function from the transmitter output to the receiver input varies with loop impedance. This implies that the required hybrid characteristics also vary with the subscriber loop. Hybrid circuits in the prior art are fixed circuits without the ability to adapt to changing requirements. This results in degraded hybrid performance and inconsistent data rates when a hybrid is deployed on a wide range of loops.

SUMMARY OF THE INVENTION

The present invention is directed to a hybrid that has at least one tunable component. The tunable component is adjustable to provide the hybrid with a desired frequency response corresponding to the characteristics of an associated communications network. For example, the hybrid can be a filter circuit and the tunable component can be tuned to provide a desired receive-signal-to-transmit-signal ratio for a digital subscriber link.

The filter can have a plurality of stages, and the tunable component would be a part of at least one of a feedback path or a feedforward path. One of the plurality of stages can be a biquad filter and another stage can be a high pass filter, for example. The tunable component can be a passive component. The tunable component can also be a part of a variable impedance network (e.g., a capacitor bank), which can be controlled to provide desired impedance that substantially matches loop impedance characteristics of the associated communications network.

Another aspect of the present invention is a method for tuning a filter. The method comprises selectively adjusting a frequency response of a hybrid in a communications network based on loop impedance characteristics of the communications network. The method can test the filter with the selected tuned component. The test can comprise applying a test signal to the line and measuring the response. The loop characteristics can be determined by applying a test signal to the line. The method can tune the filter by setting a capacitor bank associated with the filter for changing the frequency response of the filter. The filter can be re-tuned if it is determined that the response is not within expected parameters.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

The present invention is directed to systems and methods that can be employed to facilitate communications. The approaches described herein can be utilized to selectively configure a hybrid in a communications system. The hybrid includes one or more tunable components that can be adjusted to provide the hybrid with a frequency response corresponding to loop characteristics (e.g., impedance or frequency response) of an associated communications network to mitigate echo associated with a transmitter signal. According to one aspect, the hybrid can be tuned or set (e.g., by the manufacturer or during a training phase) to provide frequency dependent hybrid performance and enhance echo cancellation.

Figure 1:
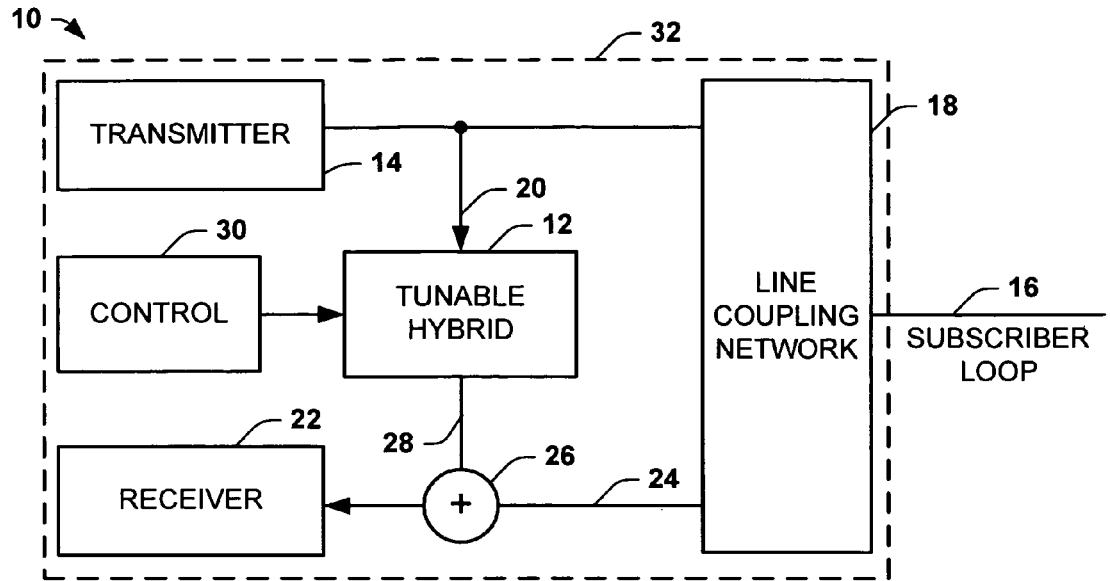
FIG. 1 is a block diagram of a communications system in accordance with an aspect of the present invention.

FIG. 1 depicts an example of a communications system 10 that can be implemented in accordance to an aspect of the present invention. The system 10 comprises a tunable filter (or hybrid) 12 coupled between transmit and receive paths of the system. In the example of FIG. 1, a transmitter 14 is coupled to provide a transmitter output signal to a subscriber loop (or other communications network) 16 via a transmit path, including through a line coupling network 18. The line coupling network 18 provides an interface between circuitry at a central office and the subscriber loop 16. The transmitter output signal is also provided as an input 20 for driving the tunable hybrid 12.

The line coupling network 18 also provides a receiver signal to a receiver 22 via a receive signal path. Thus, the line coupling network 18 provides an aggregate line input signal 24 to a summer 26. The aggregate line input signal 24 may be filtered by filtering circuitry (not shown) to remove noise, such as including noise associated with the line coupling network 18. The summer 26 also receives a filtered output signal 28 from the tunable hybrid 12. The hybrid 12 can be selectively tuned so that the filtered output signal 28 corresponds to a transmit signal component in the aggregate line input signal 24. The summer 26 in turn provides a receiver input signal to the receiver 22 based on the summer 26 subtracting the filtered transmitter output signal from the aggregate line input signal 24. As a result, the summer 26, having implemented desired echo cancellation, provides the receiver signal to the receiver 22, such that signal content outside the receive band has been substantially removed.

According to an aspect of the present invention, a control block 30 is operative to program the tunable hybrid 12 to have a frequency response that varies as a function of corresponding loop characteristics of the subscriber loop 16 and the line coupling network 18. The control 30 implements an algorithm to tune one or more passive circuit components of the tunable hybrid 12 so that the frequency response of the hybrid can substantially match the frequency response of the subscriber loop 16. The control can implement the algorithm to program (or tune) the hybrid 12 at power-up of the system 10, for example. Alternatively, the control 30 can be utilized offline (e.g., by the manufacturer) based on the known or anticipated subscriber loop characteristics. Since the frequency response of the tunable hybrid 12 can be adjusted to compensate for changes caused by varying characteristics of the subscriber loop 16, the hybrid can be utilized in various different network environments to provide desired echo cancellation.

By way of further example, the tunable hybrid 12 can include one or more tunable components, such as, for example, a combination of one or more resistors, capacitors, or inductors, which can be selectively configured to provide a desired frequency response. The arrangement of tunable components determines the range of possible frequency responses to which the hybrid 12 can be tuned. For example, the desired frequency response can adaptable to a plurality of predetermined frequency bands associated with the receiver signal. Alternatively, the frequency response can be adjustable over a continuous scale of frequency bands.

The system 10 further can employ a switch network or other selection mechanism for selecting the desired impedance from the variable impedance network. Additionally, the control system 30 can control the switch network to select the desired impedance of the variable impedance network to tune filter 12 to the loop impedance characteristics of the associated communications network.

Additionally, the tunable hybrid 12 can have one or more of stages having one or more settable poles and zeros, such as to provide desired transfer function characteristics. The poles and zeros can be set based on the tuning algorithm implemented by the control 30 to provide a frequency response corresponding to the loop characteristics of the subscriber loop 16. When the filter 12 has a plurality of stages, for example, one stage can be a biquad filter and another stage can be a high pass filter. For such a system 10, the tunable components can be implemented as part of the biquad filter, the high pass filter, or both.

Those skilled in the art will understand that different communications networks can have different loop characteristics. The transmitter signal echo in the aggregate line signal 24 can also vary (e.g., from network to network) based on the loop impedance characteristics for a given subscriber loop 16. In view of the foregoing, it will be appreciated that the control 30 can implement an algorithm to enable the tunable hybrid 12 to compensate for echo associated with a transmitter signal. This compensation can accommodate for changes in the transmitter signal echo caused by varying loop characteristics, thereby enhancing the ratio of the receive signal power relative to the echo power in the system 10. Additionally, the tunable hybrid 12, the transmitter 14 and receiver 22 can be implemented at a central office, indicated schematically at 32, such as part of a subscriber loop interface circuit, for separating transmit and receive signals.

Figure 2:
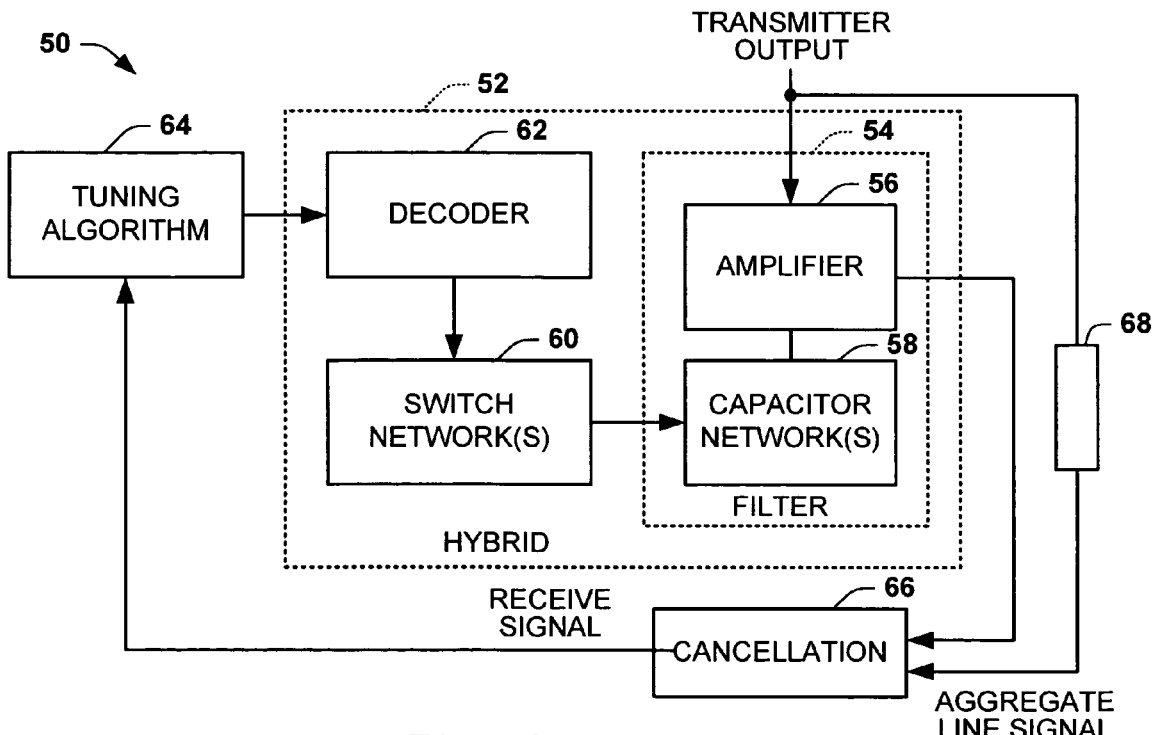
FIG. 2 is a block diagram of a tunable hybrid that can be implemented in accordance with an aspect of the present invention.

Referring now to FIG. 2, there is illustrated a system 50 in accordance with an aspect of the present invention. The system 50 includes a hybrid 52 that comprises a tunable filter network 54. In the example of FIG. 2, the filter network 54 includes an amplifier 56 and variable capacitor network 58. The variable capacitor network 58 can include one or more variable capacitors that can be selectively coupled in the feedback and/or feed-forward path of the amplifier 56. The combination provides the filter network 54 with a frequency response set by the poles and zeros of the circuit.

If the filter network 54 is implemented as a plurality of stages, for example, one stage may be a biquad filter and another stage a high pass filter. The filter network 54 can also include a low pass filter. Each stage of the filter network 54 may also include an amplifier 56. The variable capacitor network 58 may be connected to or from part of any or all of the stages. Those skilled in the art will appreciate that the filter network 54 can also include other passive components, such as an arrangement of inductors and resistors, to provide the filter network with a desired transfer function.

A switch network 60 can be used for selectively configuring the capacitor network 58 to set the transfer function of the filter network 54. The switch network 60 can include a plurality of switch devices (e.g., transistors) coupled to the capacitor network 58 of the filter network 54. The system 50 can also include a decoder 62 connected to receive a control signal from a tuning algorithm 64. The decoder 62 provides a signal (e.g., a control word) to the switch network 60 to set one or more associated switches within the switch network. By setting the switches, the tunable filter network 54 is set accordingly. In cases where there are multiple tunable components in the filter network 54, the decoder 62 can provide a separate word for each respective network. For example, if the filter network 54 includes a two stage amplifier and each amplifier stage has an associated capacitor network 54 in its feedback (or feedforward) path, the decoder 62 can provide two digital words, one for setting the capacitance for each tunable capacitor network.

The tuning algorithm 64 is programmed and/or configured for selecting the desired values for of the variable capacitance network 58. For example, the tuning algorithm can provide a test input signal to emulate a transmitter output signal that is provided to drive the hybrid 52. The transmitter output signal is also provided to an interface of an associated communications network (e.g., a subscriber loop), indicated schematically at 68. The hybrid provides a corresponding output signal having a frequency response that varies as a function of the capacitance switched in to the filter network 54 by the switch network 60.

The tuning algorithm can provide a control signal to decoder 62 that causes the switch network to adjust the capacitor network accordingly. The output of the filter network 56 can be provided to a cancellation (e.g., a summer) network 66. The cancellation network 66 subtracts the filter output signal from an aggregate line signal and provides a corresponding output signal, which corresponds to a receiver signal. The tuning algorithm 64 can monitor the receiver signal and set the capacitor network 58 to a value that causes the output of the cancellation network 66 to equal to or approach zero for a given test signal. Alternatively, a receiver signal can be provided in the test signal, in which case the output of the cancellation network 66 would approach the receiver signal. When the output of the cancellation network approaches zero (or a corresponding receiver signal), this indicates that the frequency response of the filter network 58 substantially matches loop impedance characteristics of the associated communications network 68.

Figure 3:
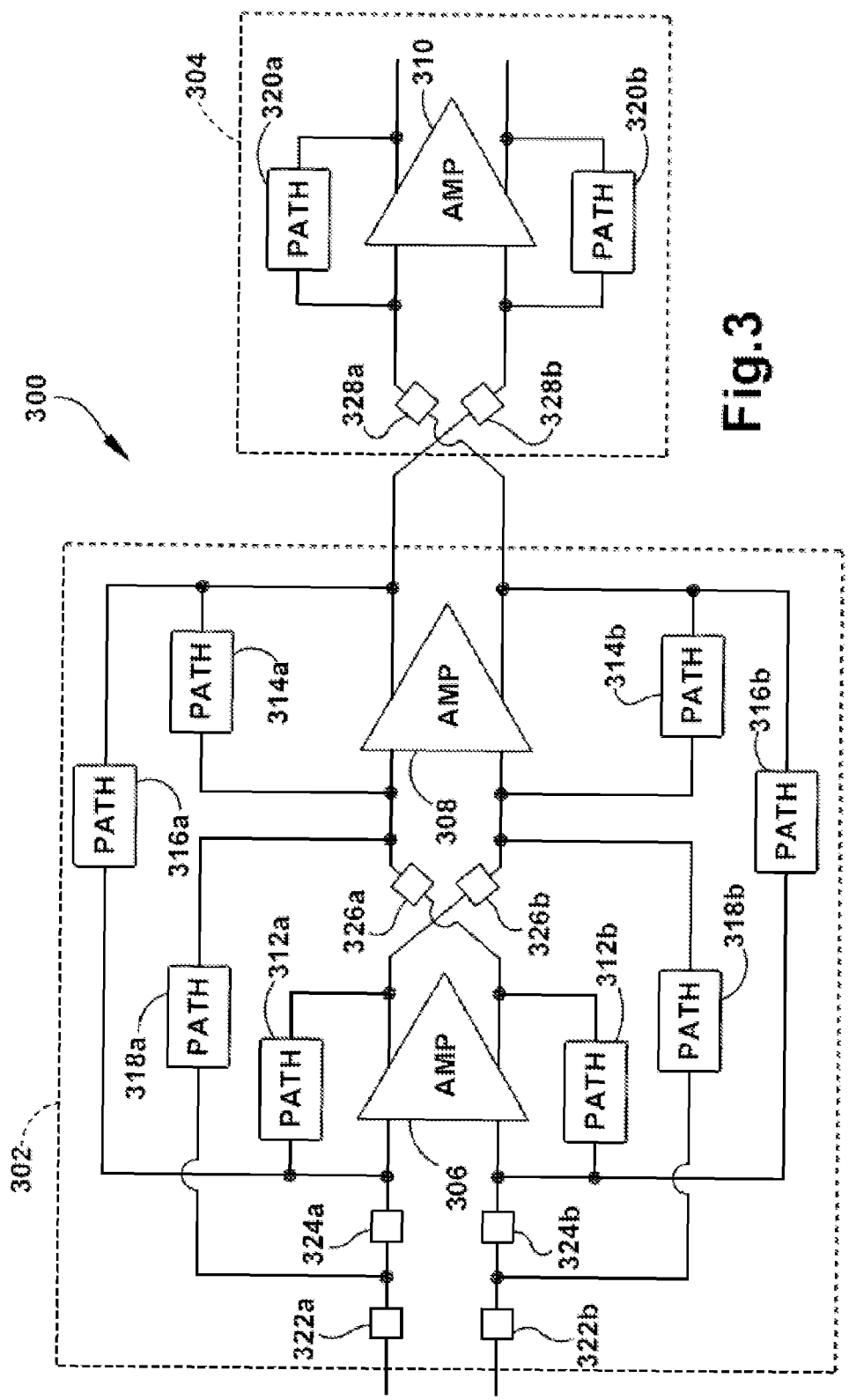
FIG. 3 is a schematic illustration of a hybrid in accordance with another aspect of the present invention.

FIG. 3 schematically illustrates an example hybrid circuit 300 that can be implemented in accordance with an aspect of the present invention. The hybrid circuit 300 comprises a biquad filter 302 in series with a high pass filter 304. This configuration provides two complex zeros, two complex poles, a zero at DC, and two real poles.

Biquad filter 302 has two amplifiers 306 and 308. High pass filter 304 has one amplifier 310. In the example of FIG. 3, each stage of biquad filter 302 has at least one feedback path. Amplifier 306 has feedback paths 312a and 312b. Amplifier 308 has feedback paths 314a and 314b. Additionally, feedback paths 316a and 316b provide feedback from the second stage to the first stage. In addition, a feedforward path 318a and 318b is provided between the first and second stages. Each feedback path 312a, 312b, 314a, 314b, 316a and 316b and each feedforward path 318a and 318b can be a tunable network. The tunable network within each path can have one or more variable impedance elements (e.g., resistors, capacitors, inductors) for selecting the impedance of the path, and hence change the frequency response of the hybrid circuit 300. Similarly, amplifier 310 of high pass filter 304 can include feedback paths 320a and 320b implemented as tunable networks that may be employed to vary the response of the high pass filter 304. Additional tunable components 322a and 322b can be utilized at the input of the hybrid circuit 300. Additionally or alternatively, tunable components 324a and 324b can be provided at the input of the amplifier 306, tunable components 326a 326b can be provided at the input of the amplifier 308, and tunable components 328a and 328b can be provided at the input, amplifier 310. The various tunable components thus can be employed to vary the hybrid circuit's 300 frequency response, as described herein.

According to an aspect of the present invention, the frequency response of the hybrid circuit 300 can be selectively adjusted to substantially match loop characteristics of an associated communications network in which the hybrid is implemented. By adjusting the frequency response of the hybrid circuit 300 according to loop characteristics (e.g., by a controller (not shown)), upstream receiver performance can be improved over many existing hybrids.

Figure 4:
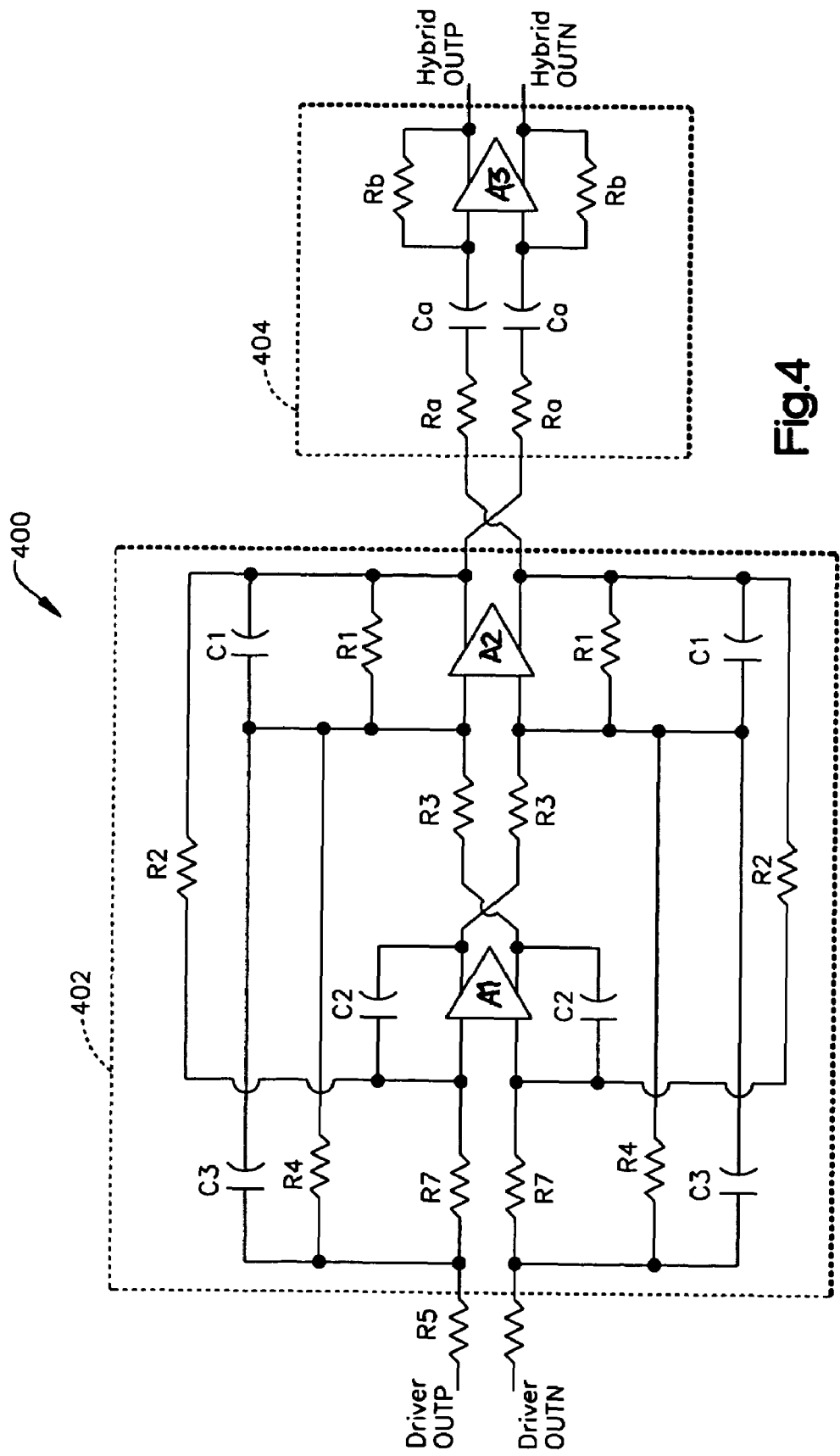
FIG. 4 is circuit diagram for a hybrid circuit in accordance with an aspect of the present invention.

FIG. 4 depicts an example circuit diagram for a hybrid circuit 400 in accordance with an aspect of the present invention. The hybrid circuit 400 comprises a biquad filter 402 and a high pass filter 404 in series with biquad filter 402. Circuit 400 provides two zeros, two complex poles as well as real low frequency and high frequency poles. Since the hybrid circuit 400 includes substantially identical circuitry associated with each pair of inputs and output, identical reference characters are utilized to identify such components. It will be appreciated, however, that different components could also be used for each pair.

In the example of FIG. 4, the inputs are Driver OUTP and Driver OUTN, and the outputs are Hybrid OUTP and Hybrid OUTN. Biquad filter 402 has a first stage with amplifier A1, and a second stage with amplifier A2. C2 forms a feedback path for A1 and R1, C1 form a feedback path for A2. R2 forms a feedback path between the output and input of biquad filter 402. R4 and C3 provide feedforwarding from the input of the biquad filter 402 to the input of the second stage amplifier A2. Varying R1, R2, R4 and/or C1, C2, C3 can change the frequency response of the biquad filter 402. C1, C2 and C3 can be implemented as capacitor banks. Each capacitor C1, C2 and C3, for example, can include its own bank of capacitors coupled to a switch network (not shown). Such switch network can be controlled to switch in or out capacitors in each bank to provide the hybrid with a desired frequency response.

For example, a decoder (not shown) can be used to send separate control signals to each capacitor bank so that each capacitor (C1, C2, C3) can be tuned individually. R1, R2, R4 may be formed by resistor networks, which could also be set individually to vary the resistances of R1, R2 and R4 accordingly. Similarly, Ra, Ca and/or Rb of high pass filter 402 can also be formed by resistor or capacitor networks, which can set to vary the frequency response of hybrid circuit 400 accordingly.

Additionally, the biquad filter 402 includes virtual ground nodes to facilitate tuning the hybrid circuit 400 to have a desired frequency response. The virtual ground nodes, for example, are located at the inputs to each amplifier. By tying C1, C2 and C3 to the virtual ground nodes in this manner, the switches that control the capacitor banks within C1, C2, and C3 are protected from over-voltage stress.

By way of further example, the following component values can be employed to tune the hybrid for the various subscriber loop impedances listed below:

Nominal Components:

| Component | Value |
| --- | --- |
| R1 | 301.714 kΩ |
| R2 | 78.3941 kΩ |
| R3 | 78.3941 kΩ |
| R4 | 73.3404 kΩ |
| R5 | 383.001 Ω |
| R7 | 35.7524 kΩ |
| Ra | 49.3616 kΩ |
| Rb | 49.3616 kΩ |
| C1 | 56.664 pF |
| C2 | 56.665 pF |
| C3 | 42.8658 pF |
| Ca | 27.1489 pF |

Tuned Components:

| Loop Impedance | C1 (pF) | C2 (pF) | C3 (pF) |
| --- | --- | --- | --- |
| 160 Ω | 44.6396 | 67.6075 | 22.539 |
| 140 Ω | 48.1554 | 63.3613 | 27.2709 |
| 120 Ω | 50.7504 | 62.1763 | 32.9849 |
| 100 Ω | 56.664 | 56.665 | 42.8658 |
| 80 Ω | 61.9641 | 53.6954 | 55.6168 |

Figure 5:
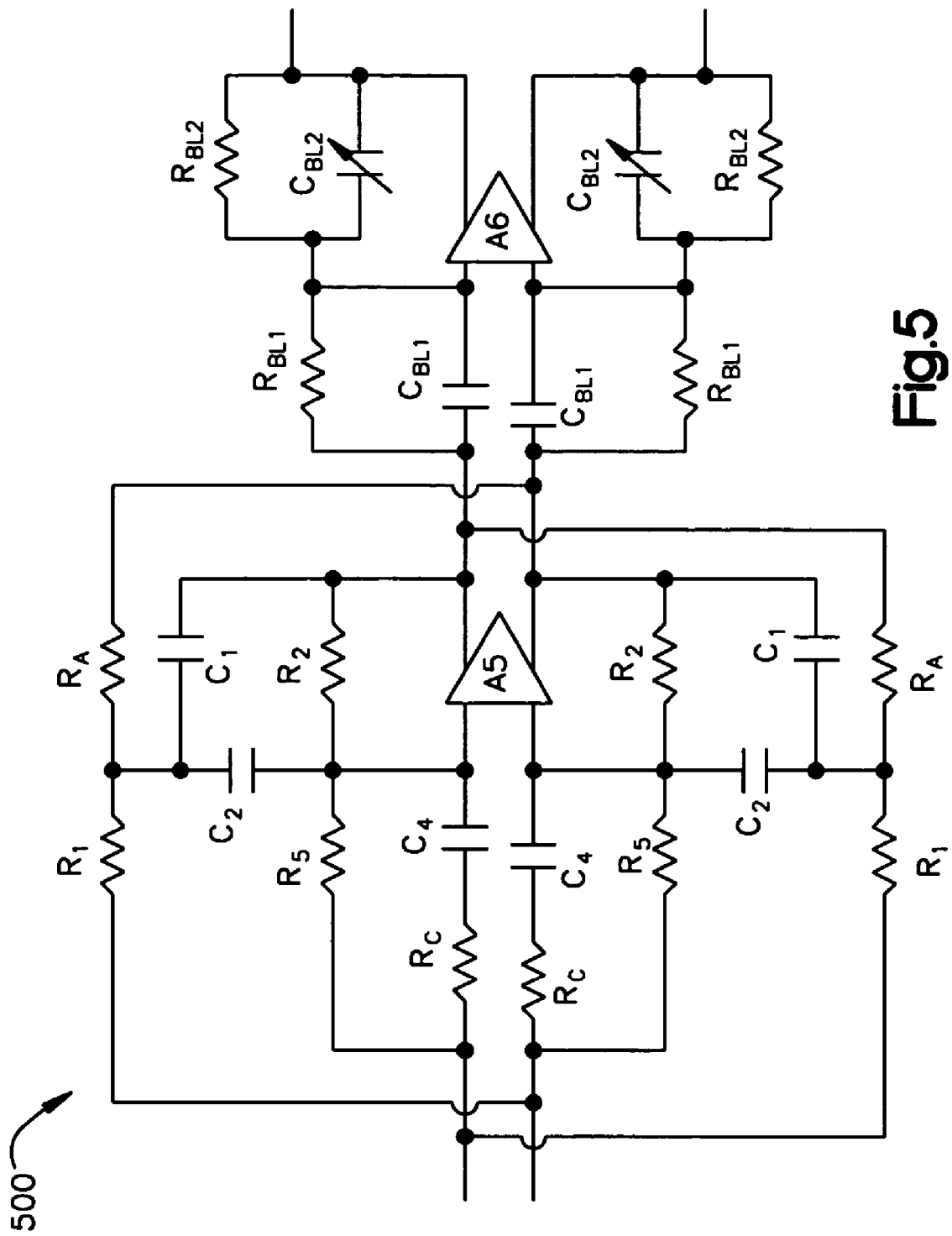
FIG. 5 is circuit diagram for a hybrid circuit in accordance with another aspect of the present invention.

FIG. 5 illustrates an example of another hybrid circuit 500 in accordance with an aspect of the present invention. Hybrid circuit's 500 transfer function has three zeros and four poles that are realized by using two differential amplifiers in combination with an impedance network, as shown. Hybrid circuit includes differential amplifiers A5 and A6.

In the example of FIG. 5, the hybrid circuit is formed by two operational amplifier circuits. The first amplifier A5 is a fully-differential amplifier configured with passive components to form a biquad (a circuit with a frequency response including a pair of complex poles and a pair of complex zeros) with an additional real pole. The second buffer amplifier is formed by A6, which forms a bilinear stage producing a real pole and zero.

Although in FIG. 5, capacitor $C_{BL2}$ is adjustable to vary the impedance of hybrid circuit 500, those skilled in the art can appreciate that other passive components in hybrid circuit 500 may be adjusted to vary the impedance, and thus the frequency response, of the hybrid circuit 500.

As shown in FIG. 5, only $C_{BL2}$ is adjustable. Therefore, the frequency response for the hybrid circuit 500 is adjusted by a single tunable component, $C_{BL2}$. With this configuration, the transfer function for the first stage is fixed while the transfer function for the second stage is adjustable.

By way of further example, the following component values can be employed to tune to a base configuration for a subscriber loop having a characteristic impedance of about 120 ohm:

$R_1$=33.97 k$\Omega$; $C_1$=88.5 pF; $R_2$=96.6 k$\Omega$; $R_{BL1}$=208.1 k$\Omega$; $C_{BL1}$=77.8 pF
$R_5$=49.62 k$\Omega$; $C_2$=88.5 pF; $R_A$=117.7 k$\Omega$; $R_{BL2}$=17.83 k$\Omega$; $C_{BL2}$=77.8 pF
$R_c$=984.4 $\Omega$; and $C_4$=28.7 pF.

By tuning $C_{BL2}$, the hybrid circuit 500 can be tuned to a range of loop impedances. Below are example values of $C_{BL2}$ for various loop impedances:

| Loop impedance | Value of $C_{BL2}$ |
| --- | --- |
| 160 ohm | 96.4 pF |
| 140 ohm | 88.2 pF |
| 120 ohm | 77.8 pF |
| 100 ohm | 66.0 pF |
| 100 ohm* | 63.1 pF |
| 80 ohm | 53.2 pF |

The 100 ohm value with the asterisk ($C_{BL2}$=63.1 pF) corresponds to German 100 ohm systems. However, the 66.0 pF setting for $C_{BL2}$ can also provide a suitable response.

Figure 6:
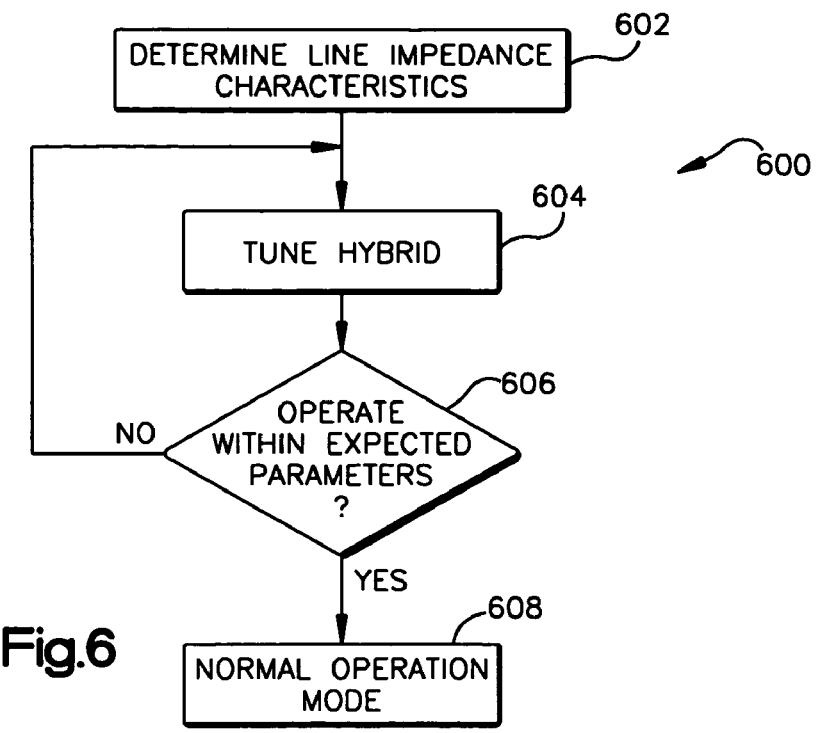
FIG. 6 is a flow diagram illustrating a method in accordance with an aspect of the present invention.
Figure 7:
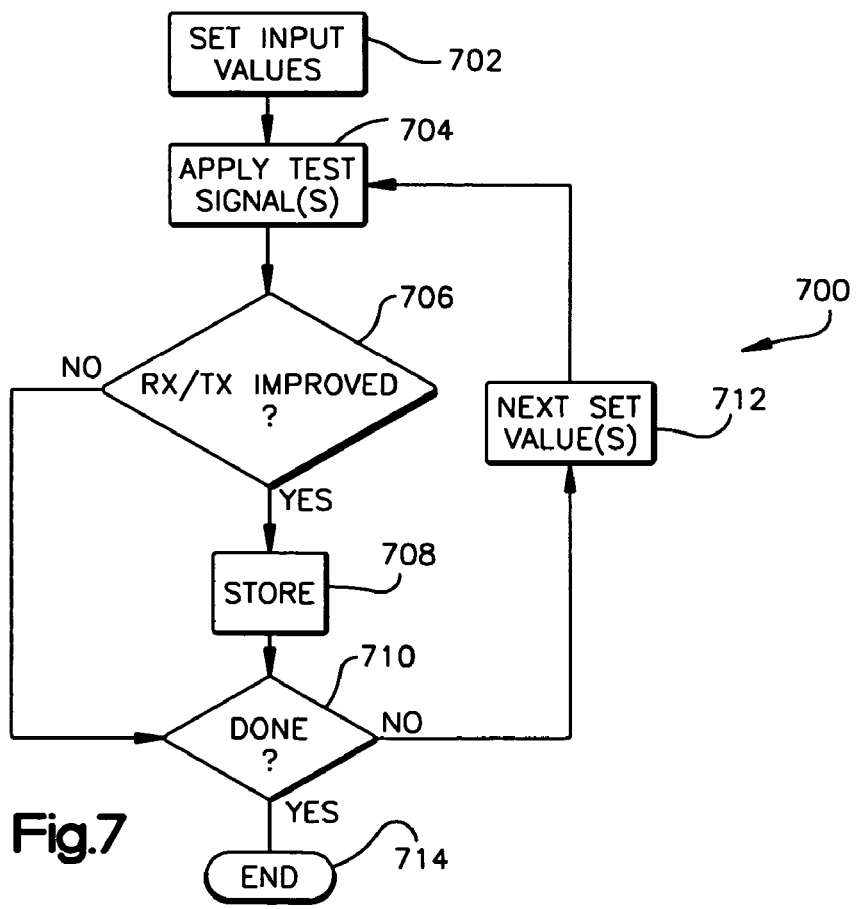
FIG. 7 is a flow diagram illustrating another method in accordance with an aspect of the present invention.

In view of the examples shown and described above, methodologies for tuning a hybrid circuit in accordance with the present invention will be better appreciated with reference to the flow diagrams of FIGS. 6-7. While, for purposes of simplicity of explanation, each methodology is shown and described as executing serially, it is to be understood and appreciated that the methodology is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodology can be implemented in hardware (e.g., one or more integrated circuits), software (e.g., running as executable instructions on a DSP, ASIC or other computer), or a combination of hardware and software.

FIG. 6 is a flow diagram illustrating a method 600 that can be employed to tune a hybrid circuit in accordance with an aspect of the present invention. At 602, the line impedance characteristics of an associated subscriber loop are determined. The line impedance characteristics can be measured for various frequencies at the central office for a digital subscriber link. The measured line impedance characteristics thus can characterize the frequency response of a corresponding subscriber loop.

At 604, the hybrid circuit is tuned. The tuning can be performed adjusting the frequency response of the hybrid circuit. For example, the frequency response can be adjusted by selecting values from a table for setting tunable components of the hybrid circuit. Component values are selected to obtain a desired ratio of Rx/Tx (receive signal/transit signal). Component values may vary as a function of loop characteristics, such as resistance, loop impedance, and/or length of the loop as well as based on the line coupling being utilized in the communications network.

At 606, a determination is made as to whether the hybrid circuit is operating within expected parameters. If at 606, the hybrid circuit is operating within expected parameters (YES), then the process is completed and the hybrid circuit can resume operating in a normal operation mode. If at 606, the hybrid circuit is not operating within expected parameters (NO), then the process returns to 604 and the hybrid is tuned with a different operating parameter. For example, the values of one or more components can be changed in response to the observed operating characteristics of the hybrid circuit. By implementing the foregoing method, the hybrid can be adapted to provide desired performance in communications networks having various different types of loop characteristics.

FIG. 7 illustrates another method 700 that can be implemented in accordance with another aspect of the present invention. This method 700 utilizes a plurality of settings for selectively configuring a hybrid circuit to achieve a desired frequency response for an associated subscriber loop. The hybrid circuit is tuned to a setting, and a test signal is then applied. The setting giving the best available performance for the associated loop is then selected. The selected setting will exist where the hybrid is tuned to substantially match the loop impedance characteristics (e.g., manifesting the greatest Rx/Tx ratio).

The method begins at 702, in which the hybrid circuit is set with an initial set of value(s). The value(s) may comprise a single component value, or a plurality of component values. The value(s) defines a frequency response for the hybrid circuit, such as based on one or more tunable components set based on the value(s). Each tunable component can include a bank or network of selectable components, such as described herein. At 704, at least one test signal is applied to the communications network associated with the hybrid circuit. The test signal (at 704) may be applied at a selected frequency or signals for a plurality of frequencies may be applied. The test signals may also vary in signal strength, phase, or type of modulation. At 706, it is determined whether the ratio of received signal to transmit signal (Rx/Tx) improved. This can be done by comparing the ratio of the current setting with the best ratio obtained from past (or initial) settings. If the ratio improved (YES), then the current settings are stored at 708. If the ratio did not improve (NO), the settings are not stored and the method can proceed to 710.

At 710 it is determined if testing is completed. If there are no more settings to be tested for the hybrid circuit (YES), then the test procedure can end, as shown by 714. The values stored at 708 would be retrieved and the hybrid circuit will operate according to the stored values. If at 710, there are more settings to be tested (NO), then the method proceeds to 712. At 712, the next value (or values) are applied to hybrid circuit, and the method returns to 704 in which the circuit is again tested to ascertain if the Rx/Tx ratio improved.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
    a tunable filter driven by an output signal of a transmitter to provide a filtered output signal, the filtered output signal being combined with a signal from an associated communications network to provide a receiver signal that is substantially free from echo caused by the output signal of the transmitter, the tunable filter comprising a biquad filter that comprises a first amplifier and a second amplifier connected in series, the first amplifier having at least one feedback path that comprises at least one first variable passive component and at least one feedforward path coupled between the first amplifier and the second amplifier that comprises at least one second variable passive component; and
    a control system configured to selectively adjust the at least one first variable passive component and the at least one second variable passive component of the tunable filter to set at least one pole and at least one zero of a transfer function of the tunable filter so that the transfer function of the tunable filter approximates loop characteristics of the associated communications network.

2. The system of claim 1, the associated communications network comprising a digital subscriber link.

3. The system of claim 1, further comprising a line coupling network that provides an interface between the transmitter and the associated communications network.

4. The system of claim 1, the signal from the associated communications network comprising an aggregate line signal that includes a component corresponding to the echo caused by the transmitter output signal and a receiver signal component, the system further comprising a summer that combines the filtered output signal from the tunable filter and the aggregate line signal to provide the receiver signal that is substantially free from echo caused by the output signal of the transmitter.

5. The system of claim 4, the control system further comprising a tuning algorithm that selectively adjusts at least one variable passive component in the tunable filter to provide the tunable filter with a desired frequency response corresponding to the loop characteristics of the associated communications network.

6. The system of claim 5, the at least one variable passive component comprising at least one capacitor.

7. The system of claim 5, further comprising a switch network coupled to adjust the at least one variable passive component so that the tunable filter achieves the desired frequency response.

8. The system of claim 7, further comprising a decoder that receives a control signal from the control system and provides an output signal to activate the switch network to set a desired impedance for the at least one variable passive component.

9. The system of claim 1, wherein the first amplifier receives the output signal of the transmitter at an input of the first amplifier, the biquad filter further comprising at least one additional variable passive component arranged between an output of the first amplifier and an input of the second amplifier.

10. The system of claim 1, wherein the at least one feedback path comprises a first feedback path arranged between an output of the first amplifier and an input of the first amplifier, a second feedback path arranged between an output of the second amplifier and the input of the first amplifier, and a third feedback path arranged between the output of the second amplifier and an input of the second amplifier, and wherein the at least one feedforward path comprises a feedforward path arranged between an input of the first amplifier and an input of the second amplifier.

11. The system of claim 1, wherein the tunable filter further comprises a second filter circuit coupled to an output of the biquad filter, the second filter circuit comprising at least one additional variable passive component that is selectively adjusted by the controller to control a frequency response of the second filter circuit to further mitigate echo caused by the output signal of the transmitter in the receiver signal.

12. The system of claim 11, wherein the second filter circuit comprises at least one additional amplifier, the at least one additional variable passive component being arranged in a respective at least one feedback path associated with the at least one additional amplifier.

13. A system, comprising:
    means for separating transmit and receive signals at an interface between a central office and a subscriber loop;
    means for decoding a control signal provided by a control system to generate an output signal having one of a plurality of states, each of the plurality of states corresponding to loop impedance and line coupling characteristics for a respective associated communications network; and
    means for selectively tuning the separating means based on the one of the plurality of states of the output signal to set at least one of at least one pole and at least one zero of the means for separating so as to configure the means for separating to have a frequency response that approximates the loop impedance and the line coupling characteristics of the associated communications network to mitigate echo effects of the transmit signal.

14. The system of claim 13, further comprising means for selectively adjusting an impedance parameter in the means for separating to provide the frequency response to the means for separating.

15. The system of claim 14, the impedance parameter comprising at least a capacitance parameter.

16. The system of claim 14, the desired frequency response being adaptable to a plurality of predetermined frequency bands associated with the loop impedance and line coupling characteristics.

17. A method, comprising
    filtering a transmitter signal to provide a filtered transmitter signal having a frequency response;
    decoding a control signal to provide a decoder output having a value corresponding to one of a plurality of impedance characteristics that approximates predetermined loop impedance characteristics of an associated subscriber loop;
    selectively adjusting at least one of at least one pole and at least one zero of a transfer function of a tunable filter of a hybrid based on the output signal to set the frequency response based on the loop impedance characteristics of the associated subscriber loop; and
    combining the filtered transmitter signal with an aggregate line input signal from the associated communications network to provide a receiver input signal that is substantially free of echo due to the transmitter signal.

18. The method of claim 17, further comprising determining the loop impedance characteristics of the associated communications network.

19. The method of claim 18, the determination of the loop impedance characteristics further comprises applying a test signal at a transmitter output comprising the transmitter signal.

20. The method of claim 17, the selectively adjusting further comprises setting impedance characteristics in at least one of a feedforward path and a feedback path of a tunable hybrid.

21. The method of claim 20, the at least one of a feedforward path and a feedback path further comprises a capacitor network, the selectively adjusting further comprises setting a desired capacitance for the capacitor network that provides the desired frequency response.

22. The method of claim 17, further comprising:
applying a test signal to a line in the associated communications network;
measuring a response to the applied test signal; and
re-adjusting the frequency response on the measured response.

23. The method of claim 17, the selectively adjusting further comprises:
setting a tunable parameter that changes the frequency response of a hybrid circuit driven by the transmitter signal;
applying a test signal to an associated communications network; and
determining a ratio of a received signal relative to the transmitter signal.

24. The method of claim 23, storing the tunable parameter setting if a ratio of the received signal to the transmitted signal has improved.

25. The method of claim 23, the tunable parameter of the hybrid circuit comprising a plurality of settings, the method further comprising selecting the next setting until all of the settings have been tested.

26. The system of claim 8, wherein the output signal has a value corresponding to one of a plurality of different predetermined loop characteristics of respective communications networks, the switch network setting the desired impedance for the at least one variable passive component based on the output signal so that the frequency response of the tunable network approximates the loop characteristics of the associated communications network.

27. A system comprising:
a tunable hybrid circuit driven by an output signal of a transmitter to provide a filtered output signal, the filtered output signal being combined with a signal from an associated communications network to provide a receiver signal, the tunable hybrid circuit having a plurality of variable passive components;
a control system that implements a tuning algorithm to provide a control signal to set parameters of the tunable hybrid circuit so that a frequency response of the tunable hybrid circuit approximates loop characteristics of the associated communications network, the control system providing the control signal based on the output signal of the transmitter and the receiver signal;
a decoder configured to decode the control signal to generate a decoder output signal; and
a switch network that coupled to adjust at least one of the plurality of variable passive components of the tunable hybrid circuit to adjust the parameters of the tunable hybrid circuit based on the decoder output signal so that the hybrid circuit operates within expected parameters.

* * * * *